United States Patent
Shivam et al.

(10) Patent No.: US 11,441,836 B2
(45) Date of Patent: Sep. 13, 2022

(54) REFRIGERATION DEVICE WITH GESTURE-CONTROLLED DISPENSER

(71) Applicant: Transform SR Brands LLC, Hoffman Estates, IL (US)

(72) Inventors: Puneet Shivam, Schaumburg, IL (US); Angel Favila, Lake in the Hills, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 152 days.

(21) Appl. No.: 16/353,043

(22) Filed: Mar. 14, 2019

(65) Prior Publication Data
US 2019/0272042 A1 Sep. 5, 2019

Related U.S. Application Data

(63) Continuation of application No. PCT/US2017/051144, filed on Sep. 12, 2017.
(Continued)

(51) Int. Cl.
*F25D 23/12* (2006.01)
*F25D 23/02* (2006.01)
(Continued)

(52) U.S. Cl.
CPC ............. *F25D 23/126* (2013.01); *B67D 1/00* (2013.01); *B67D 3/00* (2013.01); *B67D 7/00* (2013.01);
(Continued)

(58) Field of Classification Search
CPC .............. G06F 3/017; F25D 2323/121; F25D 2323/122; F25D 2331/806; F25D 23/126;
(Continued)

(56) References Cited

U.S. PATENT DOCUMENTS

| 3,429,140 A | 2/1969 | White |
| 6,789,585 B1 | 9/2004 | Janke |

(Continued)

FOREIGN PATENT DOCUMENTS

| CN | 103438658 | 12/2013 |
| WO | 2017024497 | 2/2017 |

OTHER PUBLICATIONS

"MIT and DARPA Pack Lidar Sensor Onto Single Chip", Christopher V. Poulton et al., Aug. 4, 2016, 3 pages.
(Continued)

*Primary Examiner* — Andrew D St.Clair
(74) *Attorney, Agent, or Firm* — McAndrews, Held & Malloy, Ltd.

(57) ABSTRACT

A refrigeration device includes a refrigerated compartment, a door that seals the compartment, a dispenser opening in an exterior surface of the door, and a dispenser outlet in the opening. The refrigeration device also includes a reservoir configured to hold a substance and a conveyor configured to convey the substance from the reservoir to the dispenser outlet. Measurement sensors of the refrigeration device are configured to generate first measurement signals that are indicative a gesture of a hand in the dispenser opening. A control unit of the refrigeration device is configured to ascertain a requested fill height based upon the first measurement signals. The control unit is further configured to generate signals that cause the conveyor to convey the substance from the reservoir to a container placed under the dispenser outlet and cease conveying the substance upon the container attaining the requested fill level.

28 Claims, 10 Drawing Sheets

Related U.S. Application Data

(60) Provisional application No. 62/394,445, filed on Sep. 14, 2016.

(51) Int. Cl.

| | | |
|---|---|---|
| *G06F 3/01* | (2006.01) | |
| *B67D 7/30* | (2010.01) | |
| *B67D 1/00* | (2006.01) | |
| *B67D 3/00* | (2006.01) | |
| *B67D 7/00* | (2010.01) | |
| *G06F 3/00* | (2006.01) | |
| *F25C 5/20* | (2018.01) | |

(52) U.S. Cl.
CPC ............ *B67D 7/30* (2013.01); *F25D 23/028* (2013.01); *G06F 3/00* (2013.01); *G06F 3/011* (2013.01); *G06F 3/017* (2013.01); *B67D 3/0003* (2013.01); *B67D 3/0041* (2013.01); *B67D 3/0077* (2013.01); *F25C 5/22* (2018.01); *F25D 2700/04* (2013.01)

(58) Field of Classification Search
CPC ...... F25D 2700/04; B67D 2210/00036; B67D 1/124; B67D 3/0025; F25C 5/22
See application file for complete search history.

(56) References Cited

U.S. PATENT DOCUMENTS

| | | | |
|---|---|---|---|
| 8,151,595 | B2 | 4/2012 | Kim |
| 8,627,679 | B2 | 1/2014 | Anselmino et al. |
| 2003/0167893 | A1* | 9/2003 | Morris ................... A47K 10/36 83/649 |
| 2006/0108023 | A1 | 5/2006 | Greiwe et al. |
| 2008/0011012 | A1 | 1/2008 | Marret et al. |
| 2008/0216504 | A1* | 9/2008 | Kim ..................... B67D 1/0005 62/338 |
| 2008/0264092 | A1 | 10/2008 | Chase et al. |
| 2009/0199586 | A1* | 8/2009 | Soysal ................... F25D 23/12 62/389 |
| 2010/0182136 | A1 | 7/2010 | Pryor |
| 2010/0224279 | A1 | 9/2010 | Chou |
| 2010/0293985 | A1 | 11/2010 | Voglewede |
| 2010/0307184 | A1 | 12/2010 | Jung |
| 2011/0080490 | A1* | 4/2011 | Clarkson ................... G06T 7/70 348/222.1 |
| 2011/0094255 | A1 | 4/2011 | Jeffery et al. |
| 2011/0214441 | A1 | 9/2011 | Ashrafzadeh et al. |
| 2012/0138629 | A1* | 6/2012 | Ashrafzadeh ........... G07F 13/06 222/1 |
| 2014/0237432 | A1* | 8/2014 | Geurts .................... G06F 3/005 715/863 |
| 2015/0284163 | A1 | 10/2015 | Manwani et al. |
| 2016/0137480 | A1 | 5/2016 | Ashrafzadeh et al. |
| 2016/0207753 | A1* | 7/2016 | Choi ................... B67D 1/1238 |
| 2016/0229678 | A1* | 8/2016 | DiFatta ............... B67D 1/0888 |

OTHER PUBLICATIONS

"Gimme sugar—Paja", http://mlab.taik.fi/paja/?p=232, IEEE Spectrum, Nov. 12, 2007, 15 pages.
International Search Report and Written Opinion for PCT/US2017/051144, dated Nov. 27, 2017, 12 pages.

* cited by examiner

REFRIGERATION DEVICE WITH GESTURE-CONTROLLED DISPENSER

FIELD OF THE DISCLOSURE

The present disclosure generally relates to refrigerators, freezers, and other refrigeration devices and more specifically to dispensers of such refrigeration devices.

BACKGROUND

Refrigerators commonly include an in-door water and/or ice dispenser. The in-door dispenser is generally accessible from an exterior of the refrigerator. In particular, the dispenser is incorporated in the refrigerator door such that the dispenser may selectively dispense chilled water and/or ice while doors of the refrigerator are in a closed position. Thus, a person may obtain chilled water and/or ice from the refrigerator without opening a refrigerator door. Opening a refrigerator door warms the accompanying refrigerated compartment. Accordingly, in-door dispensers may help the refrigerator operate more efficiently by reducing the number of cooling cycles for the refrigeration system that maintains the refrigerated compartment at a desired temperature.

To this end, such dispensers commonly include a lever or button that, in response to being pressed or otherwise activated, causes the dispenser to dispense water and/or ice from a spigot and/or chute. The lever or button may be placed in relation to the spigot and/or chute such that a container positioned below the spigot and/or chute activates the lever or button. In some example embodiments, the dispenser may also include a control panel having one or more buttons that a person may activate in order to cause the dispenser to dispense water and/or ice. Regardless of whether the dispenser is operated via the lever or a control panel button, the person must remain attentive in order to deactivate the activated lever or button at the appropriate time to achieve a desired level of water and/or ice in the container.

BRIEF DESCRIPTION OF THE DISCLOSURE

Shown in and/or described in connection with at least one of the figures, and set forth more completely in the claims are dispensing systems and methods that detect a requested level of water, ice, and/or some other dispensed substance based on one or more hand gestures and that fill a container with the dispensed substance to the requested level.

These and other advantages, aspects and novel features of the present disclosure, as well as details of illustrated embodiments thereof, will be more fully understood from the following description and drawings.

DETAILED DESCRIPTION

Figure 1:
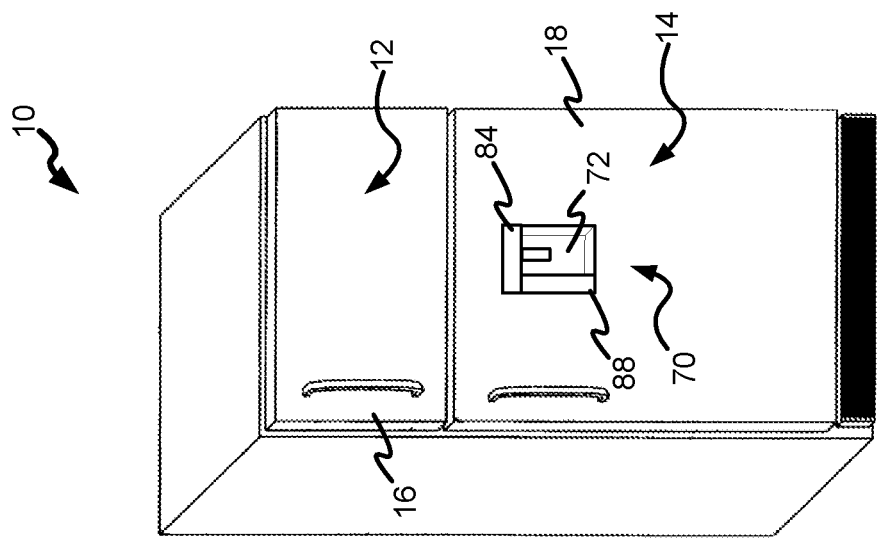
FIG. 1 shows a refrigerator having a side-by-side arrangement of refrigeration compartments and a dispenser in accordance with an example embodiment.

The following discussion presents various aspects of the present disclosure by providing examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a component may be turned sideways so that its "top" surface is facing horizontally and its "side" surface is facing vertically, without departing from the teachings of the present disclosure.

In the drawings, various dimensions may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

In some example embodiments, a dispenser may fill a container with a dispensed substance (e.g., water and/or ice) to a requested fill level. To this end, the dispenser may detect the height of the container. The dispenser may further ascertain the requested fill level based on one or more observed hand gestures. The dispenser may also monitor the level of the dispensed substance in the container as the dispenser dispenses the substance into the container. In response to determining the level of the substance in the container has achieved the desired fill level, the dispenser may cease further dispensing of the substance.

Figure 2:
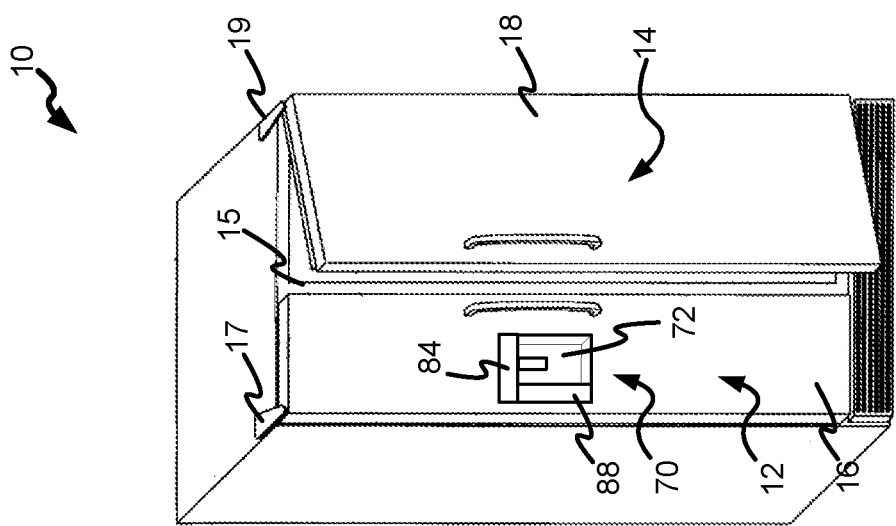
FIG. 2 shows a refrigerator having a top-freezer arrangement of refrigeration compartments and a dispenser in accordance with an example embodiment.

FIG. 1 and FIG. 2 show two example arrangements for a refrigerator or a refrigeration device 10 having an in-door dispenser. In particular, FIG. 1 depicts the refrigeration device 10 in a side-by-side arrangement in which vertical freezer and fresh foods compartments 12, 14 and respective doors 16, 18 are positioned side-by-side. FIG. 2 depicts the refrigeration device 10 in a top-freezer arrangement in which the freezer compartment 12 and respective freezer door 16 are positioned above the fresh foods compartment 14 and its respective fresh food door 18. The two arrangements shown in FIGS. 1 and 2 are exemplary and for illustrative purposes. Other arrangements may incorporate aspects of the present dispenser system. For example, the refrigeration device 10 may include one, two, three, or more refrigerated compartments. Moreover, each refrigerated compartment may include one or more doors for accessing the respective compartment.

Referring to FIGS. 1 and 2, the refrigeration device 10 may include an insulated partition 15 between the freezer and the fresh food compartments 12, 14. The refrigeration device 10 may further include a freezer door 16 and a fresh food door 18. The freezer door 16 may be hung on one or more hinges 17 which permit the freezer door 16 to swing between an opened state and a closed state. Similarly, the fresh food door 18 may be hung on one or more hinges 19 which permit the fresh food door 18 to swing between an opened state and a close state. When closed, the freezer door 16 and fresh food door 18 may respectively seal off the freezer compartment 12 and the fresh food compartment 14 from the outside. Conversely, when opened, the freezer door 16 and fresh food door 18 may grant access to the items stored in the freezer compartment 12 and the fresh food compartment 14.

The refrigeration device 10 may further include a dispenser 70 in one of the doors 16, 18. As shown, the dispenser 70 may comprise an opening 72 in an exterior surface of one of the doors 16, 18. The opening 72 is generally sized to receive a container 110 such that dispenser 70 may dispense a substance 120 (e.g., water and/or ice) into the container 110 while the doors 16, 18 remain in a closed position. See, e.g., FIGS. 6 and 7. The dispenser 70 may be implemented as a self-contained component integrated into the respect door 16, 18. In other example embodiments, the dispenser 70 may be implemented in a distributed manner with one or more components (e.g., a controller, pump, etc.) positioned at various locations in the refrigeration device 10. In network-enabled embodiments, certain aspects (e.g., gesture processing/recognition) may be distributed beyond the refrigeration device 10 itself and rely upon processing capabilities of network-accessible devices that provide cloud-based services.

Figure 3:
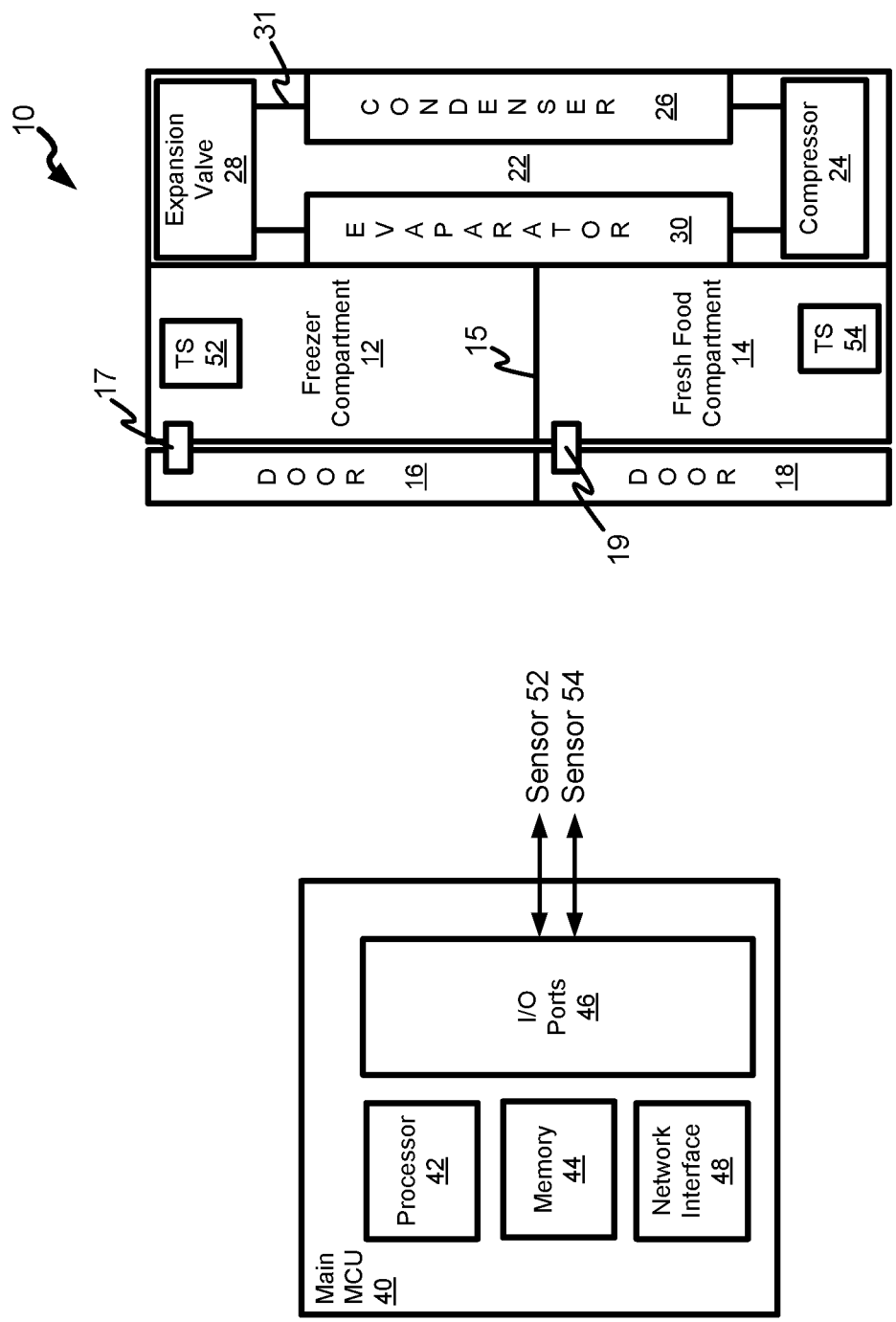
FIG. 3 provides a block diagram that depicts further details of the example refrigerators shown in FIGS. 1 and 2.

Further exemplary details of the refrigeration device 10 are shown in FIG. 3. As shown, the refrigeration device 10 may further include a refrigeration system 22 configured to cool the refrigerated compartments 12, 14. The refrigeration system 22 may include a compressor 24, a condenser 26, an expansion valve 28, and an evaporator 30, coupled to each other via tubing 31. The compressor 24 may compress refrigerant flowing through the refrigeration system 22. In particular, the refrigerant may flow from the compressor 24 through the condenser 26, the expansion value 28, and the evaporator 30 before returning to the compressor 24. The evaporator 30 may refrigerate air via heat transfer and the refrigerated air may be used to cool the compartments 12, 14.

In one example embodiment, the refrigeration system 22 may be configured to maintain the freezer compartment 12 at temperatures substantially below freezing (32° F.). The refrigeration system 22 may be further configured to maintain the fresh food compartment 14 at temperatures below ambient temperature but above freezing (32° F.). In this manner, the freezer compartment 12 may freeze or maintain frozen items and the fresh food compartment 14 may cool items without freezing such item.

As show, the refrigeration device 10 may further include a main microcontrol unit (MCU) 40. The main MCU 40 may be configured to control operation of various aspects of the refrigeration device 10. To this end, the main MCU 40 may include a processor 42, a memory 44, one or more I/O ports 46, and a network interface 48. In some example embodiments, the processor 42, the memory 44, the I/O ports 46, and the network interface 48 may be implemented with separate, discrete components. In other example embodiments, the processor 42, the memory 44, the I/O ports 46, and the network interface 48 may be provided by a single-chip microcontroller, which are available from various vendors.

The processor 42 may be configured to execute instructions, manipulate data and generally control operation of other components of the refrigeration device 10 as a result of its execution. The memory 44 may include various types of random access memory (RAM) devices, read only memory (ROM) devices, flash memory devices, and/or other types of volatile or non-volatile memory devices. In particular, such memory devices of the memory 44 may store instructions and/or data to be executed and/or otherwise accessed by the processor 42.

The I/O ports 46 may generally provide the main MCU 40 with the ability to send and receive data signals. In particular, one or more I/O ports 46 may be coupled to other components of the refrigeration device 10 to permit the exchange of data and other communications between the main MCU unit 40 and the other components. Moreover, one or more I/O ports 46 may be coupled to various sensors used to monitor aspects of the refrigeration device 10.

The network interface 48 may enable communication with external computing devices such as laptop computing devices, tablet computing device, smart phones, etc., via a network. To this end, the network interface 48 may include a wired network interface such as an Ethernet (IEEE 802.3) interface, a wireless network interface such as a WiFi (IEEE 802.11) interface, a radio or mobile interface such as a cellular interface (GSM, CDMA, LTE, etc.), and/or some other type of network interface capable of providing a communications link between the main MCU 40 and another computing device. In some other example embodiments, the main MCU 40 may be implemented without the network interface 48. In such embodiments, the refrigeration device 10 may simply operate without networking capabilities.

The main MCU 40 may be configured to control operation of the refrigeration system 22. To this end, the refrigeration device 10 may further include temperature sensor 52, 54 coupled to I/O ports 46 of the main MCU 40. The temperature sensors 52, 54 may be respectively positioned in the freezer compartment 12 and the fresh food compartment 14. Based on signals received from temperature sensor 52, 54, the main MCU 40 may determine the internal temperature of the refrigerated compartments 12, 14 and may adjust the operation of the refrigeration system 22 to maintain the refrigerated compartments 12, 14 at desired temperature levels.

Figure 4:
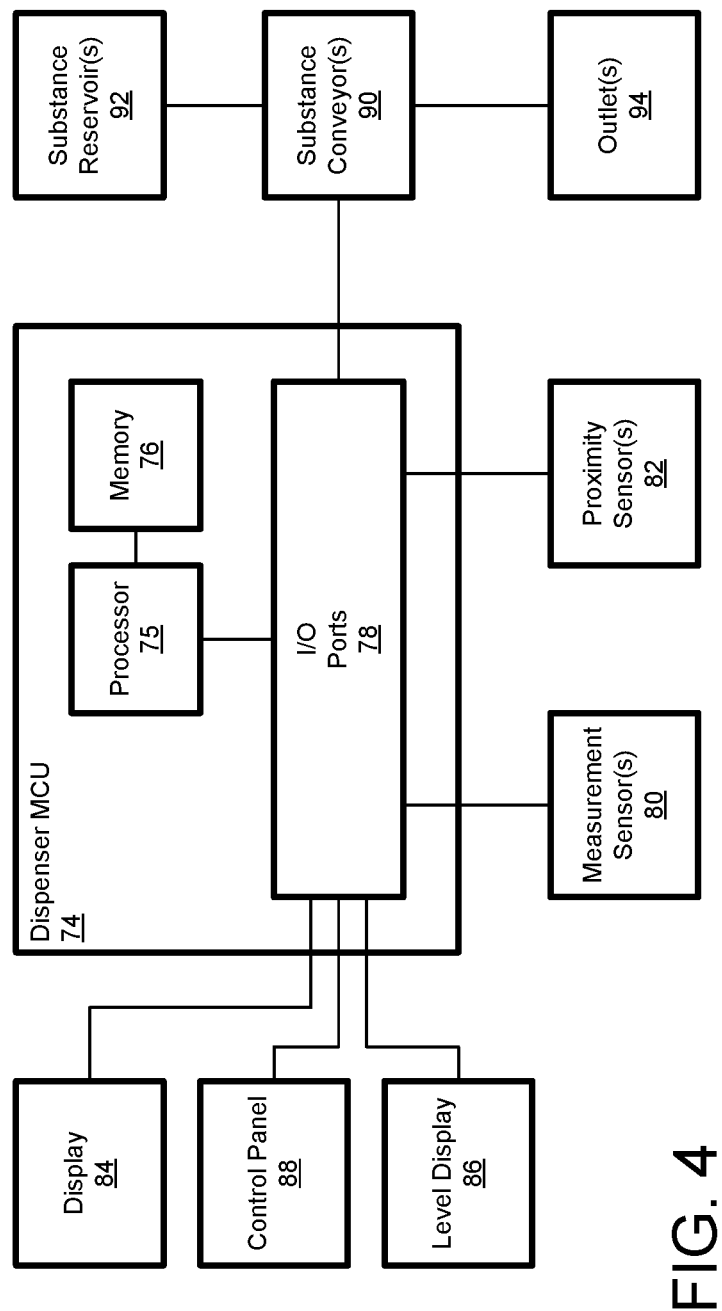
FIG. 4 provides a block diagram that depicts further details of the example dispensers shown in FIGS. 1 and 2.

Referring now to FIG. 4, an example implementation of the in-door dispenser 70 is shown in greater detail. The dispenser 70 may include a dispenser microcontrol unit (MCU) 74. In general, the dispenser MCU 74 may detect a height of a container 110 placed in the opening 72. The dispenser MCU 74 may further discern a requested fill level based on an observed hand gesture. Moreover, the dispenser MCU 74 may monitor the level of a substance 120 in the container 110 as the dispenser 70 dispenses the substance 120 into the container 110 and may cease further dispensing in response to the monitored level attaining the requested fill level.

To this end, the dispenser MCU 74 may include a processor 75, a memory 76, and one or more I/O ports 78. In some example embodiments, the processor 75, the memory 76, and the I/O ports 78 may be implemented with separate, discrete components. In other example embodiments, the processor 75, the memory 76, and the I/O ports 78 may be provided by a single-chip microcontroller, which are available from various vendors. FIG. 4 depicts the dispenser MCU 74 as separate and distinct from the main MCU 40 of FIG. 3. However, in some example embodiments, the refrigeration device 10 may include a single MCU that provides the functionality of both the main MCU 40 and the dispenser MCU 74.

The processor 75 may be configured to execute instructions, manipulate data and generally control operation of other components of the dispenser 70 as a result of its execution. The memory 76 may include various types of random access memory (RAM) devices, read only memory (ROM) devices, flash memory devices, and/or other types of volatile or non-volatile memory devices. In particular, such memory devices of the memory 76 may store instructions and/or data to be executed and/or otherwise accessed by the processor 75.

Finally, the I/O ports 76 may generally provide the dispenser MCU 74 with the ability to send and receive data, status, and/or control signals. In particular, one or more I/O ports 76 may be coupled to the main MCU 40 of the refrigeration device 10 to permit the exchange of data and other communications between the main MCU unit 40 and the dispenser MCU 74. Moreover, one or more I/O ports 76 may be coupled to one or more measurement sensors 80, one or more proximity sensors 82, a main display 84, a level display 86, a control panel 88, and one or more substance conveyors 90.

The one or more measurement sensors 80 may measure, map, image, sense, and/or observe dimensional aspects of a container 110 or hand 130 placed in the dispenser opening 72. Similarly, the one or more measurement sensor(s) 80 may measure, map, image, sense, and/or observe a fill level of a substance 120 dispensed into a container 110 placed in the dispenser opening 72. To this end, the measurement sensors 80 may include ultrasonic sensors, hand gesture sensors, radar sensors, electromagnetic field sensors, LIDAR sensors, 3D scanners, cameras, imaging sensors, and/or other sensors capable of generating signals from which measurements of the container 110, substance 120, and/or hand 130 may be obtained. Further details regarding various implementations of the measurement sensors 80 are presented below.

The one or more proximity sensors 82 may generate and provide the dispenser MCU 74 with a status signal indicative of whether the proximity sensor 82 detects placement and/or removal of an object (e.g., a container 110 and/or user's hand 130) into and/or from the dispenser opening 72. To this end, the one or more proximity sensor 82 may be positioned along a perimeter (e.g., left, right, bottom, and/or top sides) of the dispenser opening 72 and/or within the dispenser opening 72. In some example embodiments, the one or more proximity sensors 82 are implemented with one or more low power, short range sensors (e.g., ultrasound sensors) having a detection range, which collectively encompass or substantially encompass the dispenser opening 72. Moreover, the proximity sensor 82 may be implemented as an always-on sensor or as a periodically-activated (e.g., every 100 milliseconds) sensor. As such, from the perspective of a user, the one or more proximity sensor 82 may effectively continually monitor the dispenser opening 72 even if the proximity sensors 82 have short periods of inactivity in order to conserve power.

In some example embodiments, each proximity sensor 82 has a relatively-short, detection range (e.g., 1-8 inches) that extends radially from the respective sensor 82. Such proximity sensors 82 may be distributed about or in the dispenser opening 72 such that the collective detection range of the proximity sensors 82 substantially encompasses the dispenser opening 72 and its interior.

The main display 84 may present feedback and/or other information to the user of the refrigeration device 10. In particular, the main display 84 may include status LEDs (light-emitting diodes), liquid crystal displays, a graphical display, etc., via which the main MCU 40 and/or the dispenser MCU 74 provide status information and/or messages.

The level display 86 similarly may present feedback and/or other information to the user of the refrigeration device 10. More specifically, the level display 86 provides the user with feedback regarding the requested fill level detected by the dispenser 70, thus providing the user with visual confirmation that the dispenser has appropriately detected the user's requested fill level. Such fill level feedback may be presented via a number of different ways including illuminating appropriate LEDS, presenting a graphical display, etc. As such, in some example embodiments, the main display 84 may provide the features of the level display 86 or the level display 86 may be incorporated into the main display 84.

However, in one example embodiment, the level display 86 is implemented via a controllable, illuminating pointing device (e.g., laser pointer, LED pointer, etc.) directed toward the dispensing opening 72. More specifically, the pointing device may be mounted to a servomotor or other controllable device that is configured to direct light emitted by the pointing device based on one or more control signals of the dispenser MCU 74. Alternatively, the pointing device may be mounted in a fixed manner and a mirror, lens, or other light directing device may controllably direct the emitted light based on one or more control signals of the dispenser MCU 74.

Regardless of the manner by which the light is directed, the dispenser MCU 74 generates control signals which cause the level display 86 to illuminate a portion 116 of the container 110 corresponding to the requested fill level R. See, e.g., FIGS. 6 and 7. In this manner, the user may simply look at the container 110 to confirm that the dispenser 74 has correctly detected the desired fill level.

The control panel 88 is also coupled to the dispenser MCU 74. The control panel 88 may provide buttons, switches, sliders, touch panels, and/or other user input controls. The control panel 88 may generate and provide the dispenser MCU 74 with control signals indicative of actuated input controls. In this manner, a user may active controls of the control panel 88 to control the operation of the dispenser 70. For example, via the input controls of the control panel 88, the user may select a substance 120 (e.g., water, ice, juice, milk, etc.) that the dispenser 70 is to convey or dispense into the container 110.

As shown, the dispenser MCU 74 is further coupled to the one or more substance conveyors 90. Based on control signals from the dispenser MCU 74, each substance conveyor 90 is configured to convey a desired or selected substance 120 from its respective substance reservoir 92 to a container 110 in the dispenser opening 72 via one or more dispenser outlets 94. To this end, the substance conveyors 90 may include a pump configured to pump liquid (e.g., water, juice, milk, etc.) from the appropriate reservoir 92 to the outlet 94. The substance conveyors 90 may further include a worm screw, gear, or other mechanical device configured to convey a solid substance 120 (e.g., ice) from the appropriate reservoir 92 to the outlet 94.

Figure 5:
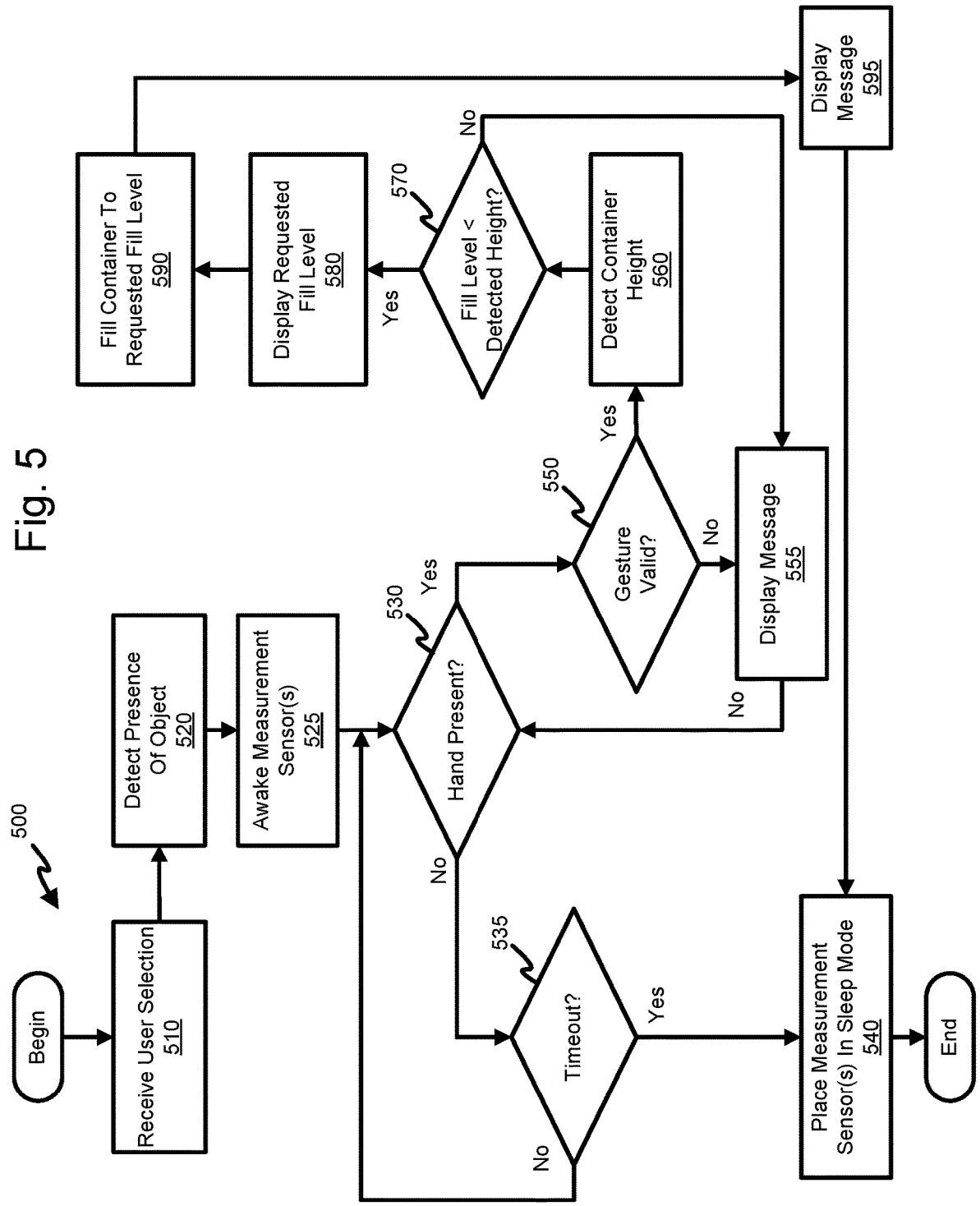
FIG. 5 shows a flowchart of an example dispensing method implemented by the dispenser shown in FIGS. 1 and 2.

Turning now to FIG. 5, a flowchart depicting a dispensing method 500 for one example embodiment of the dispenser 70 is shown. In particular, the dispenser 70 may generally perform the method 500 under the control of the dispenser MCU 74. For clarity purposes, the dispensing method 500 is described below with respect to dispensing water into a container 110. While described with respect to dispensing water, the method 500 is also applicable to dispensing of other substances such as ice, juice, etc.

At 510, a user may select a substance 120 to be dispensed. To this end, the user may active one or more controls of the control panel 88 to select which substance or substances the dispenser 70 is to dispense. For example, the user may press a button on the control panel 88 associated with chilled water. In response to the button being pressed, the control panel 88 may generate one or more control signals that request the dispenser MCU 74 to dispense chilled water as the dispensed substance 120.

At 520, the dispenser 70 may detect the presence of an object in the dispenser opening 72. In particular, the user may place a container 110 such as a glass, cup, mug, pitcher, bowl, etc. in the dispenser opening 72. In response to the dispenser opening 72 receiving the container 110, the one or more proximity sensors 82 may detect its presence in the opening 72. The proximity sensor 82 may then generate one or more control signals, which inform the dispenser MCU 74 of the presence of an object in the opening 72.

In response to the control signals of the proximity sensor 82, the dispenser MCU 74 at 525 may awake the one or more measurement sensors 80. In one example embodiment, dispenser MCU 74 may place the measurement sensors 80 into a low-power, sleep mode during periods of inactivity in order to conserve energy. In response to proximity sensor 82 detecting an object in the opening 72, the dispenser MCU 74 may generate one or more control signals that awake the measurement sensors 80 so that such sensors 80 may measure, measure, map, image, sense, and/or observe dimensional aspects of the object(s) in the dispenser opening 72. In some example embodiments, the dispenser MCU 74 may also awake the measurement sensors 80 in response to a user activating one or more of the controls of the control panel 88.

The dispenser MCU 74 at 530 may determine based on signals of the measurement sensors 80 whether a user's hand 130 may be present in the opening 72. In particular, the measurement sensors 80 may provide signals indicative a motion within the opening 72. The dispenser MCU 74 may infer such motion may be due to the presence of a user's hand 130 in the opening 72.

If a user's hand 130 is not present, the dispenser MCU 74 may determine at 535 whether a timeout period has elapsed since awakening the measurement sensors 80 at 525. If the timeout period has not elapsed, the dispenser MCU 74 may return to 530 in order to further monitor for the presence of a user's hand 130. Otherwise, the dispenser MCU 74 may proceed to 540. At 540, the dispenser MCU 74 may generate one or more signals that place the measurement sensors 80 in a low-power, sleep state. After placing the measurement sensors 80 in the sleep state, the dispenser MCU 74 may cease the dispensing method 500 until re-invoked by the user at 510.

If a user's hand 130 is detected, the dispenser MCU 74 at 550 may determine whether the measurement sensors 80 have detected a valid hand gesture for specifying a desired fill level. Details of various example approaches for detecting a valid hand gesture are presented below. If the signals generated by the measurement sensors 80 are not indicative of a valid hand gesture, then the dispenser MCU 74 at 555 may generate one or more signals that cause the main display 84 to present the user with an appropriate message. For example, the message may inform the user that the gesture was not recognized and that the user may wish to try again. The dispenser MCU 74 may then return to 550 in order to assess further signals received from the measurement sensors 80 for the presence of a user's hand 130 and a valid hand gesture.

If a valid hand gesture was detected, the dispenser MCU 74 at 560 may process signals from the measurement sensors 80 to ascertain the height of the container 110. Then the dispenser MCU 74 at 570 may compare the ascertained height of the container 110 to the requested fill level specified by the detected hand gesture. In particular, the dispenser MCU 74 may verify that the requested fill level R is not greater than the ascertained height H of the container 110 to ensure that dispenser 74 does not attempt to fill the container 110 beyond its capacity.

In some example embodiments, the dispenser MCU 74 may further confirm that the requested fill level is less than the detected height of the container 110 by more than a margin (e.g., 0.25 inch). Such margin may be predetermined and calculated by the dispenser MCU 74 based on the expected accuracy by which the dispenser MCU 74 is capable of detecting the height of the container 110, detecting the fill level requested by the hand gesture, and/or monitoring the level of the substance 120 in the container 110 as the container 110 is filled. In this manner, the dispenser MCU 74 may provide some tolerance to ensure the dispenser 70 does spill the dispensed substance 120 as a result of overfilling the container 110.

If the dispenser MCU 74 determines that the requested level is not less than the height of the container 110, the dispenser MCU 74 at 555 may generate one or more signals that cause the main display 84 to present the user with an appropriate message. For example, the message may inform the user that requested fill level exceeds the capacity of the container 110 and that the user may wish to try again. After presenting the message at 555, the dispenser MCU 74 may return to 550 in order to assess further signals received from the measurement sensors 80 for the presence of a user's hand and a valid hand gesture.

If the requested fill level R is less than the height H of the container 110, then the dispenser MCU 74 at 580 may generate signals that cause the level display 86 to present the user with the requested fill level R. In one example embodiment, the dispenser MCU 74 may generate signals that cause a pointing device of the level display 86 to illuminate a portion 116 of the container 110 corresponding to the requested fill level R. As such, the dispenser MCU 74 may provide visual feedback to the user in a manner that enables the user to quickly and easily confirm that the requested fill level, as detected by the dispenser 70, corresponds to the fill level desired by the user.

After and/or while presenting the requested fill level R via the level display 86, the dispenser MCU 74 at 590 may generate control signals that cause the substance conveyor 90 to fill the container 110 with the selected substance 120 up to the requested fill level. To this end, the dispenser MCU 74 may generate signals that cause the substance conveyor 90 to convey the selected substance 120 to the container 110. Upon initiating the conveyance of the substance 120 to the container 110, the dispenser MCU 74 may generate signals that cause the display 84 to present appropriate feedback. For example, the dispenser MCU 74 may cause the display to present the message "Begin filling."

While the container 110 is being filled with the selected substance 120, the measurement sensors 80 may provide the dispenser MCU 74 with signals that are indicative of the level L of the selected substance 120 in the container 110. The dispenser MCU 74 based on such signals may ascertain the current level L of the substance 120 in the container 110. When the ascertained current level of the substance 120 attains the requested fill level R, the dispenser MCU 74 may generate signals that cause the substance conveyor to cease further conveyance of the substance 120 to the outlet 94. In this manner, the dispenser MCU 74 may fill the container 110 to the requested level R.

After filling the container 110 to the requested level R, the dispenser MCU 74 at 595 may generate one or more signals that cause the main display 84 to present the user with an appropriate message. For example, the dispenser MCU 74 may cause the display 84 to present the message "Ready . . . " to indicate that the dispenser 70 is done dispensing of the substance 120. After presenting the message at 595, the dispenser MCU 74 may return to 540 in order to place the sensors 80 in the low-power sleep mode until the method 500 is invoked again at 510.

As noted above, the measurement sensors 80 at 550 may detect a requested fill level R based on a hand gesture. Moreover, the measurement sensors 80 at 560 detect a container height H. While shown as sequential operations in FIG. 5, the sensors 80 in some example embodiments may perform these steps in the reverse order or may perform aspects of 550 and 560 concurrently. Moreover, the measurement sensors 80 may be implemented using a variety of different types of sensors. As such, the manner by which the measurement sensors 80 obtain the requested fill level R at 550 and/or the height H of the container 110 at 560 may vary based on the type of sensors used. Below are presented further exemplary details regarding various example implementations of detecting the requested fill level R at 550 and detecting the height H of the container 110 at 560 for different embodiments of dispensers 70.

Figure 6:
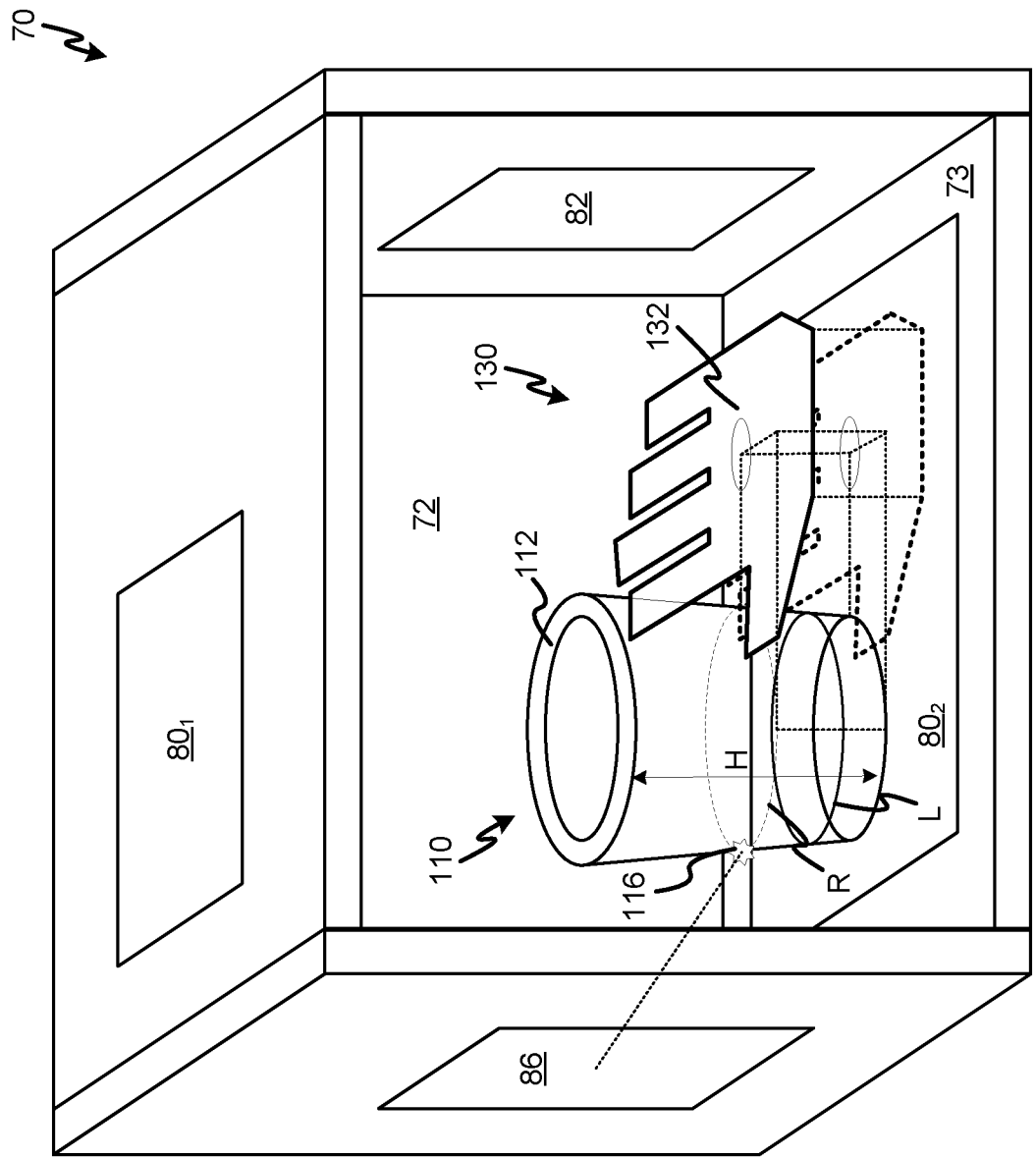
FIG. 6 depicts a container in an opening of the dispenser of FIGS. 1 and 2 as well as an example flat hand gesture for requesting a height to which the container is to be filled.
Figure 6:
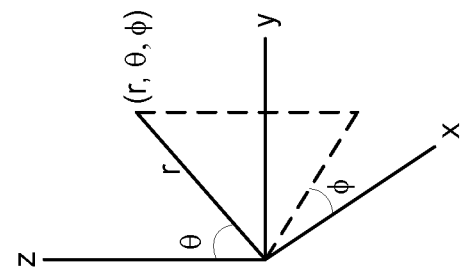
Figure 7:
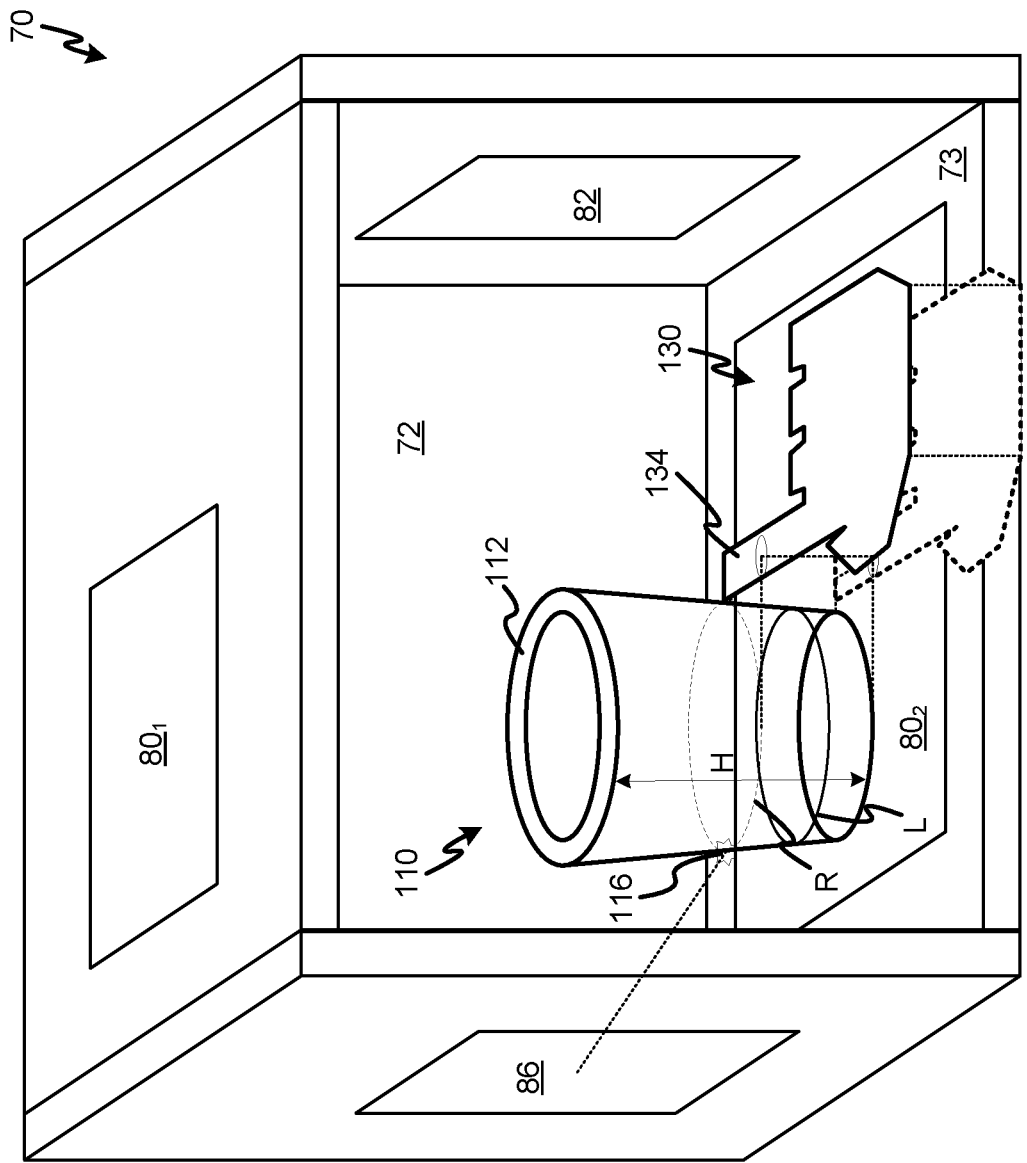
FIG. 7 depicts a container in an opening of the dispenser of FIGS. 1 and 2 as well as another example hand gesture for requesting a height to which the container is to be filled.

As shown in FIGS. 6 and 7, the measurement sensors 80 may include an upper sensor $80_1$ and a lower sensor $80_2$. The upper sensor $80_1$ may be positioned above the opening 72 or toward the top of the opening 72. The upper sensor $80_1$ may be used to detect the height H of a received container 110 as well as the level L of a substance 120 in the container 110. The lower sensor $80_2$ may be position below the opening 72 or toward a bottom or shelf 73 of the opening 72. The lower sensor $80_2$ may be used to detect in free space a gesture of a user's hand 130.

To this end, the lower sensor $80_2$ of the measurement sensors 80 may include a hand gesture sensor. The hand gesture sensor may include, for example, the MGC3030 chip available from Microchip Technologies Inc., the Soli chip available from Google Inc, an array of ultrasonic range sensors, or some other sensor capable of generating signal indicative of a user's hand gesture in free space.

The MGC3030 chip is a 3D gesture controller that enables gesture based user interfaces in a single chip. The MGC3030 chip uses an electrical-field (E-field) for three-dimensional (3D) gesture recognition. The MGC3030 chip enables user command input with natural hand movements in free-space. In particular, the MGC3030 chip can recognize the hand position and give x, y, and z coordinates of hand 130 or fingers or any other object within the E-field. The development kit, provided by Microchip Technologies Inc., provides tools that can be used to customize the spatial arrangement of the electrodes to determine the center of gravity of the electric field distortion. The development kit also includes parameter files which can be used to fine tune the gesture recognition. As the hand 130 or part of the hand moves, the MGC3030 chip may detect changes in x, y, and z coordinates of the center of gravity of the hand 130 or part of hand 130. Based on such detected changes in the x, y, z coordinates of the part of hand or hand 130, the MGC3030 chip may detect and recognize a gesture performed by the user's hand 130.

Google Soli chip operates on a similar principle. However, the Soli chip uses a radar field instead of an E-field. The Soli chip is further capable of detecting small finger movements and is able to recognize gestures based on such small finger movements (e.g., a pinching motion involving the index finger and thumb). The Soli development kit provides tools for developers to create and define new gestures.

A 2D array of ultrasonic sensors is also an option for implementing a hand gesture sensor. The 2D array of ultrasonic sensor may form beams that map and detect objects within the opening 72. Based on such mapping, the 2D array of ultrasonic sensors may generate signals from which the dispenser MCU 74 may detect hand gestures in the opening 72.

The MGC3030 chip and the Soli chip essentially provide self-contained systems for detecting a hand gestures. In particular, one skilled in the art, using the provided development kits, may readily configure such chips to detect the hand gestures noted below. As such, the following does not address in detail the process for detecting the flat hand gesture or finger gesture with the MGC3030 chip and the Soli chip at 550 of the method 500.

As noted above, a 2D array of ultrasonic sensors $80_2$ may be used to recognize a hand gesture such as a flat hand gesture and/or a finger gesture to specify a requested fill level. In one example embodiment, the 2D array of ultrasonic range sensors $80_2$ are placed along the bottom shelf 73 of the opening 72 such that lower sensors $80_2$ can detect coordinates of the palm 132 of a user's hand 130. The 2D array of sensors $80_2$ are capable of not only making linear measurements, i.e., behaving as a linear array of ultrasonic sensors, but also making phase angle measurement, i.e., behaving as a phased array of sensors with the capability of beam forming different angles in an spherical coordinate system of radius r, angle $\theta$, and angle $\phi$. The dispenser 70 may use the beam forming capability to change focal points for measuring distances of obstacles at different points in the environment.

Figure 8:
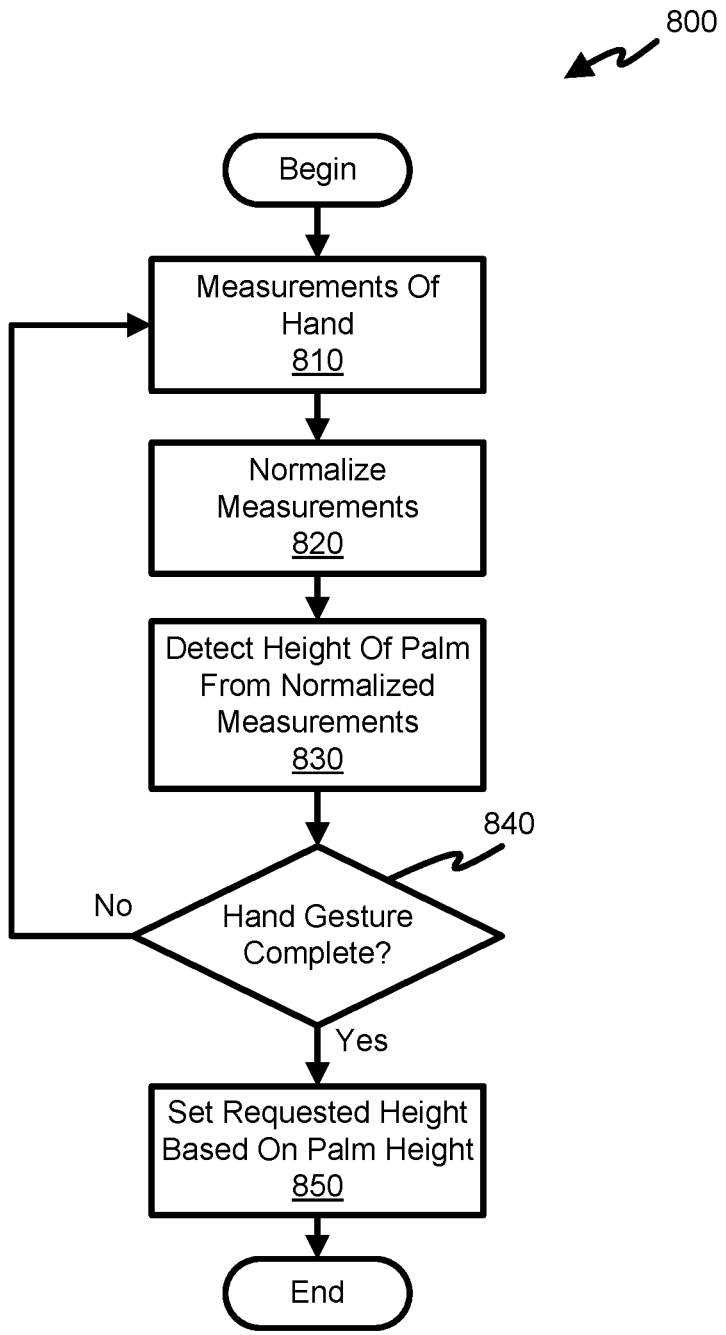
FIG. 8 shows a flowchart of an example flat hand gesture recognition method implemented by the dispenser shown in FIGS. 1 and 2.

Referring now to FIG. 8, a hand gesture recognition method 800 is shown, that is suitable for implementing step 550 of FIG. 5. In response to the user placing his hand 130 in the opening 72, the ultrasonic sensors $80_2$ at 810 may provide the dispenser MCU 74 with signals indicative of measured points of the user's hand 130. The dispenser MCU 74 may process the received measurement signals to detect the height of the user's palm 132. See, FIG. 6.

To this end, the dispenser MCU 74 at 820 may normalize the received measurements of the user's hand 130 by placing the received measurements into different buckets. In one example embodiment, each bucket corresponds to a pre-defined or configurable difference (e.g., 1 mm). Placing the measurements into the buckets thus addresses minor differences in received measurements. Moreover, such normalization/bucketizing may also address curvature of the user's hand 130 and stress flatter areas of the palm 132. The dispenser MCU 74 may further assign a normalize measurement value to each bucket. In particular, the normalize measurement value may be set to the mean of the measurements placed in the respective bucket.

At 830, the dispenser MCU 74 may process the normalized measurements to detect a height of the palm 132. In particular, assuming a flat hand gesture as shown in FIG. 6, the mode of the normalized measurements corresponds to the height of the palm 132 of hand 130. As such, the dispenser MCU 74 may calculate the mode of the normalized measurements to obtain the height of the palm 132 from the sensor $80_2$.

The dispenser MCU 74 at 840 may determine whether the user has finished moving his hand in order to specify the requested fill level R. To this end, the dispenser MCU 74 may determine whether the calculated mode has remained within a predetermined threshold for a predetermined period of time. If so, the dispenser MCU 74 at 850 may determine that the user has stopped moving their hand 130 and may set the requested fill level R to the calculated mode. However, if the calculated mode has varied beyond the predetermined threshold or the predetermine period of time has yet to elapse, the dispenser MCU 74 may return to 810 in order to process further measurement signals from the sensors $80_2$.

Figure 9:
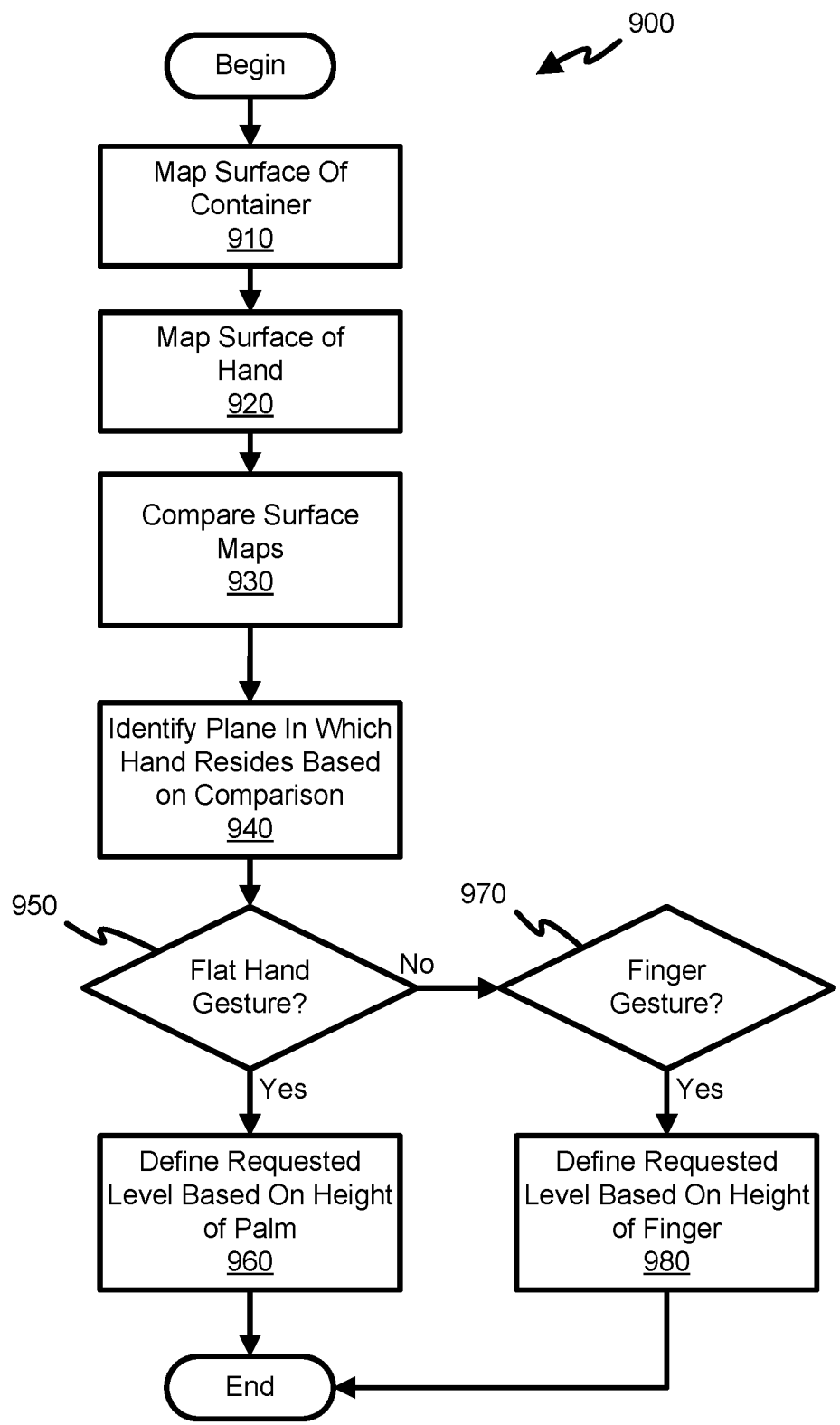
FIG. 9 shows a flowchart of an example hand gesture recognition method implemented by the dispenser shown in FIGS. 1 and 2.

Referring now to FIG. 9, a hand gesture recognition method 900 is shown, that is suitable for implementing step 550 of FIG. 5 in a manner that distinguishes between a flat hand gesture and a finger gesture.

At 910, the ultrasonic sensors $80_2$ may use beam forming to map or measure an outer surface of the container 110. In this manner, the ultrasonic sensors $80_2$ may provide the dispenser MCU 74 with signals that specify a measured surface profile of the container 110. In particular, the ultrasonic sensor $80_2$ may generate such a surface profile during a time when the user's hand is not in the opening 72.

In response to the user placing his hand in the opening 72, the ultrasonic sensors $80_2$ at 920 may provide the dispenser MCU 74 with signals indicative of measured points of the user's hand 130. The dispenser MCU 74 may process the received measurement signals to detect the height of the user's palm 132 or finger 134. In particular, the ultrasonic sensors $80_2$ may continue to use beam forming to map or measure the hand 130. In this manner, the ultrasonic sensor $80_2$ may provide the dispenser MCU 74 with signals that specify a measured surface profile of the user's hand 130.

At 930, the dispenser MCU 74 may compare the measurement signals of the hand 130 to the surface profile of the container 110 to detect a location of the hand 130. In particular, based on such comparison, the dispenser MCU 74 may identify an angle $\theta$ at which the difference between the measurements for the hand 130 and corresponding measurements of the container are greater than a threshold level.

At 940, the dispenser MCU 74, based on the angle $\theta$ and corresponding measurement signal, may define a plane parallel to the bottom surface of the opening 72 in which the hand 130 is detected. The dispenser MCU 74 at 950 determines whether the hand gesture is a flat hand gesture. To this end, the dispenser MCU 74 may cause the sensors $80_2$ to form on identified plane. If a continuous obstacle is detected along such plane, the dispenser MCU 74 at 950 may infer the flat hand gesture and may utilize the above method 800 at 960 to obtain the requested fill level R based on the height of the palm 132.

If not, then the dispenser MCU 74 at 970 may confirm the finger gesture of FIG. 7. To this end, the dispenser MCU 74 may cause the lower sensors $80_2$ to form along the identified plane, but only in the y direction. Doing so causes the lower sensors $80_2$ to measure along the length of the user's finger 134, if present. If a continuous obstacle is detected along the plane in the y direction, then the dispenser MCU 74 at 970 may infer a finger gesture. In which case, the dispenser MCU 74 at 980 may obtain the requested fill level R using the above method 800, but using only the measurements obtained when focusing along the plane in the y direction.

Figure 10:
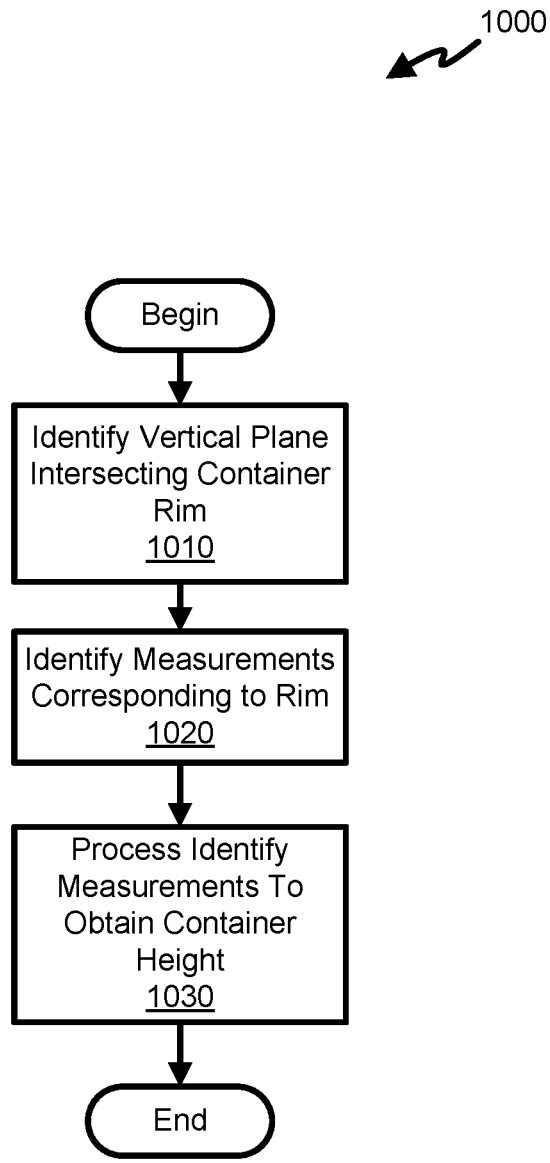
FIG. 10 shows a flowchart of an example container height detection method implemented by the dispenser shown in FIGS. 1 and 2.

Referring now to FIG. 10, a method 1000 of detecting the height H of the container 110 is shown. After receiving the container 110, the dispenser MCU 74 at 1010 may cause the upper sensor $80_1$ to scan in the x and y directions in order to identify a vertical plane (e.g., a plane parallel to the y and z axes) that intersects the rim 112 of the container 110. In particular, the dispenser MCU 74 may identify a suitable vertical plane by identifying a plane in which the measurement signals specify distances that are less than the distance from the upper sensor $80_1$ to the shelf 73 of the opening 72.

After identifying an appropriate plane, the dispenser MCU 74 at 1020 identifies measurement signals corresponding to the container rim 112. To this end, the dispenser MCU 74 may identify measurement signals corresponding to the two shortest distances generated by the upper sensor $80_1$. The dispenser MCU 74 may subtract such distance measurements from the known distance to the bottom or shelf 73 of the opening 72 upon which the container 110 rests to obtain measurements of the height or distance H from the shelf 73 to the rim 112. In one example embodiment, the dispenser MCU 74 may exclude any measurement signals corresponding to a height greater than the height of the opening 72. The dispenser MCU 74 at 1030 may then average the two shortest distances and subtract the resulting average from the known distance to the shelf 73 to obtain the height H of the container 110.

In an exemplary alternative embodiment, the upper sensor $80_1$ may provide measurements for the total 360° around the rim 112. The dispenser MCU 74 may then determine the height H based on the mode of the corresponding heights for the total 360° of the rim 112.

Figure 11:
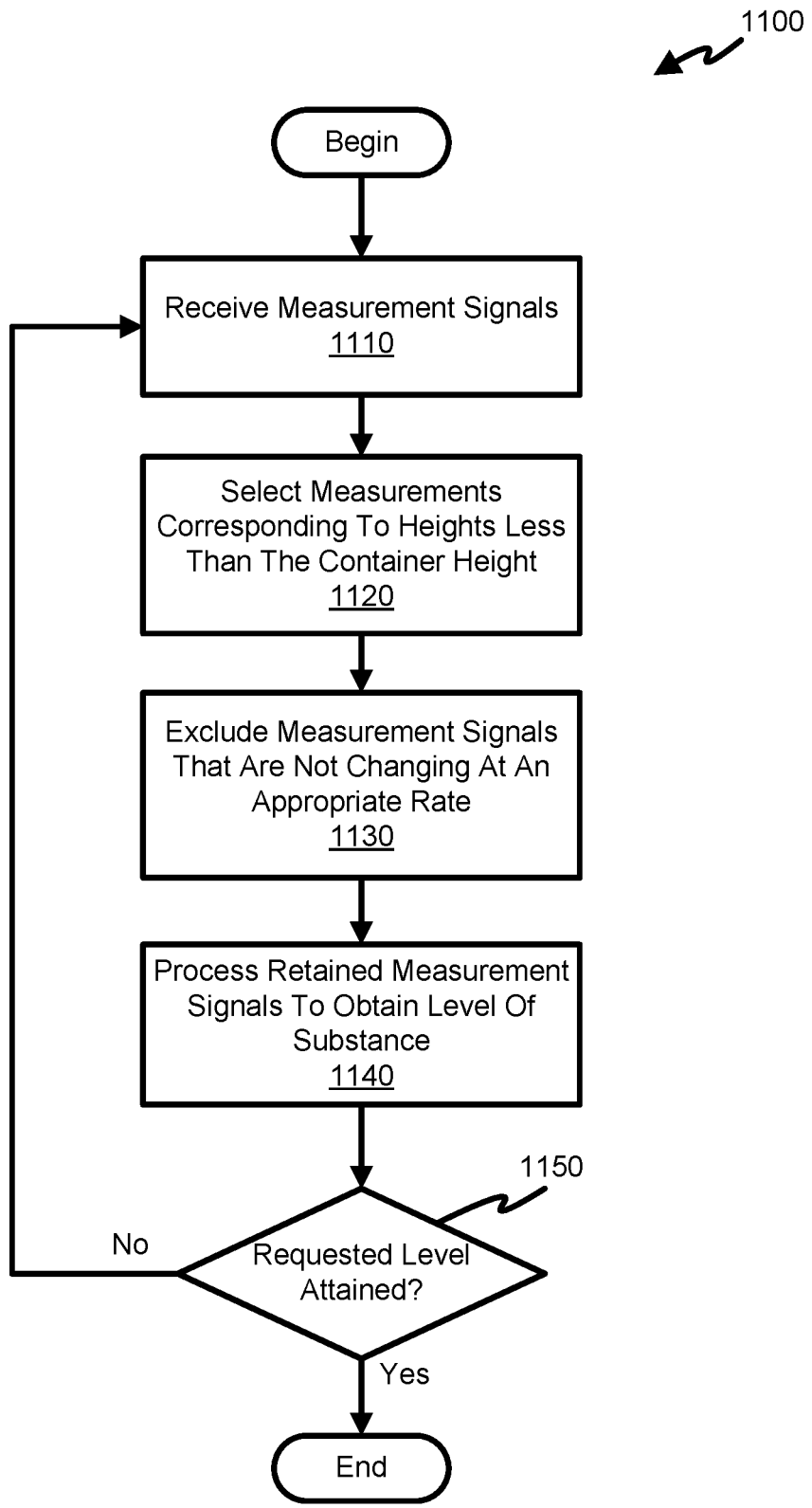
FIG. 11 shows a flowchart of an example substance level monitoring method implemented by the dispenser shown in FIGS. 1 and 2.

Referring now to FIG. 11, a method 1100 of monitoring the level L of the substance 120 in the container 110 is shown. While the substance 120 is dispensed into the container 110, the upper sensor $80_1$ at 1110 may provide measurement signals to the dispenser MCU 74 that are indicative of both the container 110 and the level L of the substance 120 in the container 110.

The dispenser MCU 74 may filter the measurement signals to obtain measurements associated with the level L of the substance 120. To this end, the dispenser MCU 74 at 1120 may select measurement signals that specify distances corresponding to heights from the shelf 73 that are less than the height H of the container 110, but greater than the height of the shelf 73. Moreover, the dispenser MCU 74 at 1130 may exclude measurement signals associated with distances that are not reducing (i.e., heights that are not increasing) at a threshold level of change. Since the dispenser 70 is in the process of filling the container 110, the level L of the substance 120 should rise in the container 110 at a relatively constant rate. Thus, any measurement signals that are not specifying distances that are reducing at a rate of change associated with filling the container 110 may be excluded.

At 1140, the dispenser MCU 74 may process the remaining measurement signals to obtain the level L of the substance 120. In particular, the dispenser MCU 74 may calculate the average of the retained measurement signals and subtract such average from the distance to the shelf 73 to obtain the height or level L of the substance 120 in the container 110.

If the dispenser MCU 74 determines at 1150 that the level L of the substance 120 has yet to attain the requested fill level, then the dispenser MCU 74 may return to 1110 to continue monitoring the level L of the substance 120 in the container 110.

As explained above, the measurement sensors 80 in one example embodiment may include upper sensors $80_1$ and lower sensors $80_2$. In some example embodiments, the measurement sensors 80 may be implemented with a LIDAR (light detection and ranging) sensor that measures distances to a target by illuminating the target with pulsed laser light, and measuring the reflected pulses with a sensor. A LIDAR sensor may measure distance from itself to any point in the opening 72. In particular, the beam forming capability of the LIDAR sensor may cover all the points in the volume of the opening 74. As such, the LIDAR sensor operates similar to a 3D scanner reporting the distance or radius r, the angle θ, and the angle φ to all the obstacles in the opening 74. Such a LIDAR sensor may be placed at any of the six corners (e.g., back, lower, left corner) of the opening 74 in order to set the origin of the LIDAR sensor to such corner. The wide beam forming capability of the LIDAR sensor may be used to detect hand gesture/finger gesture, height H of container 110, surface coordinates of the container 110, and continuously monitor the level L of the dispensed substance 120. As such, the LIDAR sensor may replace both the upper sensor $80_1$ and lower sensor $80_2$ resulting in a single measurement sensor embodiment. Moreover, in such an example embodiment, the dispenser MCU 74 may process the measurement signals of the LIDAR sensor per the methods of FIGS. 8, 9, and 10.

Various embodiments have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices such as the MCUs 40, 74 performing various aspects of the above-described methods and/or processes.

While the present disclosure has described certain embodiments, it will be understood by those skilled in the art that various changes may be made and equivalents may be substituted without departing from the intended scope of protection. In addition, many modifications may be made to adapt a particular situation or material to the teachings of the present disclosure without departing from its scope. Therefore, it is intended that the present disclosure not be limited to the particular embodiment or embodiments disclosed, but encompass all embodiments falling within the scope of the appended claims.

What is claimed is:

1. A method of a dispenser of a refrigeration device, the method comprising:
   generating, with one or more ultrasonic sensors of the dispenser, measurement signals indicative of a hand positioned in a dispenser opening;
   measuring, with a control unit of the refrigeration device based on the measurement signals, a height of the hand in free-space within the dispenser opening, wherein the height of the hand is in relation to a bottom shelf of the dispenser opening;
   setting a requested fill height to the measured height of the hand within the dispenser opening;
   dispensing a substance into a container placed in the dispenser opening; and
   ceasing said dispensing in response to the substance in the container attaining the requested fill level.

2. The method of claim 1, further comprising awakening the one or more ultrasonic sensors in response to a proximity sensor detecting that the opening of the dispenser received an object.

3. The method of claim 1, further comprising detecting, with the control unit, a height of the container based on the measurement signals.

4. The method of claim 3, further comprising confirming, before said dispensing, that the requested fill level is less than the detected height of the container.

5. The method of claim 1, further comprising detecting, with the control unit, a level of a substance in the container based on the measurement signals.

6. The method of claim 1, further comprising directing a pointing device to illuminate a portion of the container corresponding to the requested fill level.

7. The method of claim 1, further comprising:
   generating a surface map of the hand based on the measurement signals;

wherein measuring the height of the hand comprises detecting the height of the hand based on the generated surface map of the hand.

8. A method of a dispenser of a refrigeration device, the method comprising:
generating, with one or more ultrasonic sensors of the dispenser, measurement signals indicative of a hand positioned in a dispenser opening;
detecting, with a control unit of the refrigeration device based on the measurement signals, a height of the hand in free-space within the dispenser opening;
setting a requested fill height to the detected height of the hand within the dispenser opening;
dispensing a substance into a container placed in the dispenser opening; and
ceasing said dispensing in response to the substance in the container attaining the requested fill level;
wherein detecting the height of the hand comprises:
detecting, based upon the measurement signals, a palm of the hand within the dispenser opening and a relation of the detected palm to the container; and
determining the requested fill height based upon the relation of the detected palm to the container.

9. The method of claim 8, further comprising awakening the one or more ultrasonic sensors in response to a proximity sensor detecting that the opening of the dispenser received an object.

10. The method of claim 8, further comprising detecting, with the control unit, a height of the container based on the measurement signals.

11. The method of claim 10, further comprising confirming, before said dispensing, that the requested fill level is less than the detected height of the container.

12. The method of claim 8, further comprising detecting, with the control unit, a level of a substance in the container based on the measurement signals.

13. The method of claim 8, further comprising directing a pointing device to illuminate a portion of the container corresponding to the requested fill level.

14. A method of a dispenser of a refrigeration device, the method comprising:
generating, with one or more ultrasonic sensors of the dispenser, measurement signals indicative of a hand positioned in a dispenser opening;
detecting, with a control unit of the refrigeration device based on the measurement signals, a height of the hand in free-space within the dispenser opening;
setting a requested fill height to the detected height of the hand within the dispenser opening;
dispensing a substance into a container placed in the dispenser opening; and
ceasing said dispensing in response to the substance in the container attaining the requested fill level;
wherein detecting the height of the hand comprises:
detecting, based upon the measurement signals, a finger of the hand in the dispenser opening and a relation of the detected finger to the container; and
determining the requested fill height based upon the relation of the detected finger to the container.

15. The method of claim 14, further comprising awakening the one or more ultrasonic sensors in response to a proximity sensor detecting that the opening of the dispenser received an object.

16. The method of claim 14, further comprising detecting, with the control unit, a height of the container based on the measurement signals.

17. The method of claim 16, further comprising confirming, before said dispensing, that the requested fill level is less than the detected height of the container.

18. The method of claim 14, further comprising detecting, with the control unit, a level of a substance in the container based on the measurement signals.

19. The method of claim 14, further comprising directing a pointing device to illuminate a portion of the container corresponding to the requested fill level.

20. A refrigeration device, comprising:
a refrigerated compartment;
a door movable between a closed state that seals the refrigerated compartment and an opened state that grants access to the refrigerated compartment;
a dispenser opening in an exterior surface of the door;
a dispenser outlet in the dispenser opening;
a reservoir configured to hold a substance;
a conveyor configured to convey the substance from the reservoir to the dispenser outlet;
one or more ultrasonic sensors configured to generate measurement signals that are indicative of a hand in the dispenser opening; and
a control unit configured to measure, based on the measurement signals, a height of the hand in free-space within the dispenser opening, wherein the height of the hand is in relation to a bottom shelf of the dispenser opening, set a requested fill height to the measured height of the hand, generate signals that cause the conveyor to convey the substance from the reservoir to a container placed under the dispenser outlet, and cease conveying the substance upon the container attaining the requested fill level.

21. The refrigeration device of claim 20, further comprising:
a proximity sensor configured to generate a signal in response to the dispenser opening receiving an object;
wherein the control unit is further configured to awaken the one or more ultrasonic sensors in response to receiving the signal from the proximity sensor.

22. The refrigeration device of claim 20, wherein the control unit is further configured to detect a height of the container based on the measurement signals.

23. The refrigeration device of claim 22, wherein the control unit is further configured to confirm that the requested fill level is less than the detected height of the container before causing the conveyor to convey the substance to the container.

24. The refrigeration device of claim 20, wherein the control unit is further configured to detect a level of the substance in the container based on the measurement signals.

25. The refrigeration device of claim 20, further comprising:
a pointing device configured to selectively illuminate portions of the container; wherein the control unit is further configured to cause the pointing device to illuminate a portion of the container that corresponds to the requested fill level.

26. The refrigeration device of claim 20, wherein the control unit is further configured to measure the height of the hand by:
detecting, based upon the measurement signals, a palm of the hand within the dispenser opening and a relation of the detected palm to the bottom shelf of the dispenser opening; and ascertain the requested fill height based upon the relation of the detected palm to the bottom shelf of the dispenser opening.

27. The refrigeration device of claim 20, wherein the control unit is further configured to measure the height of the hand by:
    detecting, based upon the measurement signals, a finger of the hand in the dispenser opening and a relation of the detected finger to the bottom shelf of the dispenser opening; and
    ascertain the requested fill height based upon the relation of the detected finger to the bottom shelf of the dispenser opening.

28. The refrigeration device of claim 20, wherein the control unit is further configured to:
    generate a surface map of the hand based on the measurement signals; and
    detect the height of the hand based on the generated surface map of the hand.

* * * * *